United States Patent [19]

Neil et al.

[11] Patent Number: 5,087,399

[45] Date of Patent: Feb. 11, 1992

[54] METHOD OF MAKING LARGE CROSS SECTION INJECTION MOLDED OR SLIP CAST CERAMIC SHAPES

[75] Inventors: Jeffrey T. Neil, Acton; Sheldon Lieberman, Burlington; Michael Hackney, Acton, all of Mass.

[73] Assignee: GTE Laboratories Incorporated, Waltham, Mass.

[21] Appl. No.: 474,423

[22] Filed: Feb. 2, 1990

[51] Int. Cl.$^5$ ............................................. C04B 35/64
[52] U.S. Cl. ...................................... 264/62; 264/63; 264/86; 264/328.2; 501/32
[58] Field of Search ................ 264/63, 62, 86, 328.2; 501/32

[56] References Cited

U.S. PATENT DOCUMENTS

| | | | |
|---|---|---|---|
| 2,939,199 | 6/1958 | Strivens | 264/63 |
| 3,234,308 | 2/1966 | Hermann | 264/63 |
| 3,607,608 | 9/1971 | Siefert | 264/60 |
| 3,882,210 | 5/1975 | Crossley et al. | 264/63 |
| 4,144,207 | 3/1979 | Ohnsorg | 260/235 |
| 4,248,813 | 2/1981 | Hattori | 264/62 |
| 4,283,360 | 8/1981 | Henmi | 264/63 |
| 4,460,527 | 7/1984 | Kato | 264/56 |
| 4,507,224 | 3/1985 | Toibana et al. | 252/516 |
| 4,530,875 | 7/1985 | Donomoto | 428/283 |
| 4,533,345 | 9/1985 | Wei | 501/95 |
| 4,558,016 | 12/1985 | Bronson et al. | 501/95 |
| 4,569,886 | 2/1986 | Divecha | 428/379 |
| 4,579,699 | 4/1986 | Verzemnieks | 264/43 |
| 4,585,500 | 4/1986 | Minjolle et al. | 156/89 |

FOREIGN PATENT DOCUMENTS

| | | |
|---|---|---|
| 0032403 | 7/1981 | European Pat. Off. . |
| 92180 | 7/1981 | Japan . |
| 95640 | 6/1983 | Japan . |
| 120406 | 7/1984 | Japan . |
| 137366 | 8/1984 | Japan ................... 501/95 |

OTHER PUBLICATIONS

J. A. Mungels *Development of Injection Molded Reaction Bonded* $Si_3N_4$, Ceramics for High Performance Applications-II, Proc. of 5th Army Mat'l. Tech. Confer., Mar. 21-25, 1977, pp. 113-130.

T. J. Whalen, J. E. Noakes and L. L. Terner, Progress On Injection-Molded Reaction-Bonded SiC, Ceramics for High Performance Applications-II, Proc. of 5th Army Mat'l. Tech. Confer., Mar. 21-25, 1977 pp. 179-189.

G. D. Schnittgrund, Injection Molded Ceramic Rocket Engine Components, SAMPE, Quarterly, Jul. 1987 p. 873.

C. L. Quachenbush et al., Fabrication of Sinterable Silicon Nitride by Injection Molding, 19th Summary Report, ATD Contractors Coor. Mtg. Oct. 26-29, 1981, pp. 424-437.

G. Bandyopadhyay, Injection Molded Silicon Nitride for Engine Applications: Fabrication and Properties, Proc. of the 21st ATD Contractors Coor. Mtg., Mar. 1984, pp. 315-320.

A. B. Searle, R-W. Grimshaw, The Chemistry and Physics of Clays and Other Ceramic Materials, Interscience Pub. Inc. 3rd Ed., pp. 512-513.

*Primary Examiner*—James Derrington
*Attorney, Agent, or Firm*—Carl F. Ruoff

[57] ABSTRACT

A method for making essentially crack free large cross section ceramic articles by injection molding techniques comprises the use of from about 0.1 v/o to about 10 v/o fibers with the ceramic injection molding formulation followed by the injection molding, binder removal and densification steps to form an essentially crack free densified large cross section ceramic article. The fibers are softened prior to the onset of densification and incorporated into the ceramic intergranular phase. This process eliminates the component distortion during densification which would have occurred if the fibers remained in the component.

18 Claims, No Drawings

METHOD OF MAKING LARGE CROSS SECTION INJECTION MOLDED OR SLIP CAST CERAMIC SHAPES

FIELD OF THE INVENTION

This invention relates to a method of making essentially crack free ceramic parts.

More particularly, this invention relates to a method of making essentially crack free large cross section injection molded or slip cast ceramic parts.

BACKGROUND OF THE INVENTION

Two methods of fabricating large cross section structural ceramic parts of complex shape (e.g. turbine engine rotors) are by an injection molding process or a slip casting process In injection molding, a ceramic powder such as silicon nitride with the appropriate additives to promote densification and to impart the desired material properties is mixed with an organic binder in such a way that the mixture attains the properties of a thermoplastic material. It is then shaped by injection molding techniques and equipment well known in the plastics industry. The organic binder is removed by a thermal process involving liquification, pyrolysis and distillation. The resulting porous ceramic green body is densified by hot isostatic pressing or sintering.

The non-destructive removal of the organic binder however, remains the yield limiting step in the process. For successful densification by hot isostatic pressing or cold isostatic pressing followed by sintering, the parts must emerge from the binder removal step in an externally crack free condition. Internal flaws must be minimized in order to maintain dimensional tolerances. These conditions become more difficult to attain as the parts become larger in cross section and complexity. Lower yields of acceptable parts result.

In slip casting, a ceramic powder such as silicon nitride with the appropriate additives to promote densification and to impart the desired material properties is mixed with a liquid vehicle, typically water, dispersants and organic binder in such a way that the mixture attains a suitable low viscosity for pouring or pumping into a porous mold. The porous mold adsorbs excess liquid vehicle leaving a solid component of ceramic powder and binder, saturated with liquid vehicle in the spaces between ceramic particles. The component is removed from the mold and dried to remove the residual liquid vehicle. The organic binder is removed by a thermal process involving liquification, pyrolysis and distillation. The resulting porous ceramic green body is densified by hot isostatic pressing or sintering.

The non-destructive removal of the residual liquid vehicle in a thick cross section slip cast component requires a slow controlled drying cycle. For successful densification by hot isostatic pressing or cold isostatic pressing followed by sintering, the parts must emerge from the binder removal step in an externally crack free condition. Internal flaws must be minimized in order to maintain dimensional tolerances. These conditions become more difficult to attain as the parts become larger in cross section and complexity. Lower yields of acceptable parts result.

SUMMARY OF THE INVENTION

In accordance with one aspect of the present invention, a new and improved method for making an essentially crack free large cross section ceramic article comprises the following steps:

Step 1—a ceramic article injection molding formulation containing a binder is blended with from about 0.1 v/o to about 10 v/o short glass fibers to form a mixture;

Step 2—the mixture from step 1 is injection molded to form a molded article;

Step 3—the binder from the molded article from step 2 is removed to form a green body;

Step 4—the green body from step 3 is densified to form an essentially crack free and undistorted densified ceramic article.

In accordance with another aspect of the present invention, a new and improved method for making an essentially crack free large cross section ceramic article comprises the following steps:

Step 1—a ceramic article slip casting formulation containing ceramic powder, liquid vehicle dispersants and binder is blended with from about 0.1 to about 10 v/o short glass fibers to form a mixture;

Step 2—the mixture from step 1 is slip cast to form a cast article;

Step 3—the liquid vehicle from the cast article from step 2 is removed to form a dried green body;

Step 4—the binder from the molded article from step 3 is removed to form a green body;

Step 5—the green body from step 4 is densified to form an essentially crack free densified ceramic article.

OBJECTS OF THE INVENTION

Accordingly, it is an object of the present invention to provide a new and improved method of removing binder from an injection molded ceramic part having a large cross section ceramic article. The method is also suitable for improving resistance to cracking during the drying stage of slip cast component fabrication.

The method involves the use of small amounts of short glass fibers which reinforce the component during the critical stages of injection molding binder removal or slip cast drying. The glass fibers used are then designed to soften prior to the onset of densification shrinkage, thus eliminating the tendency of whisker or fiber reinforced ceramic components to distort during densification. The glass fibers then contribute to the liquid phase densification mechanism and remain as part of the intergranular phase in the final densified component.

DETAILED DESCRIPTION OF THE INVENTION

Ceramic powder/fiber compositions, which when used in a ceramic injection molding or slip casting process routing, increase the quality and yield of large cross section parts of complex shapes through improvement of the binder removal or drying process step.

The ceramic powder/fiber compositions retard both internal and external crack formation during the binder removal or drying step thus producing higher yields and increased quality.

In general cracks found in large cross section ceramic parts which were injection molded or slip cast are associated with non-uniform shrinkage which occurs in the part due to powder particle rearrangement or migration as the binder is liquified and removed in injection molded components or as the residual liquid vehicle is removed from slip cast components during drying. The addition of relatively small amounts of fibers or whiskers, from about 0.1 v/o to about 10 v/o, preferably from about 0.25 to 5 v/o, to the powder utilized in the injection molding or slip casting process reduces or eliminates this cracking in two ways. The fibers or whiskers retard shrinkage by acting as reinforcing blocks to particle migration and impart a greater "green strength" to the part which reduces cracking (Table 1).

TABLE 1

RELATIVE GREEN STRENGTH OF BURNED OUT INJECTION MOLDED BARS AS A FUNCTION OF WHISKER CONCENTRATION

| Whiskers v/o | Modulus of Rupture (lb/sq in) |
|---|---|
| 2 | 335 |
| 5 | 510 |
| 10 | 757 |

Fiber or whisker additions which constitute from about 0.1% to about 10% of the volume of the ceramic powder contained in the injection molding feed stock have been shown to be effective without seriously compromising the molding process. Whiskers or fibers of silica, high silica glasses, and yttrium-silicon-oxygen-nitrogen glasses can be used. These fibers have diameters in the 1 to 10 micron range, and aspect ratios of 20 to 200. Melt viscosity of the compounded mixture is increased proportionally to the concentration of fibers or whiskers added, but does not significantly interfere with the molding process. External binder removal related cracking was eliminated, and internal cracking was reduced in turbocharger sized test parts. Sinterability is reduced with 1% additions resulting in densities approximately 95% of theoretical. However, these samples can be HIPed (hot isostatically pressed) to greater than 98% of theoretical density. HIPing is a viable technique for the manufacture of ceramic parts of large cross section and complex shape.

The injection molding is usually carried out utilizing the transfer method or the direct injection method. In the transfer method a hydraulic press forces the material from a heated storage chamber, by means of a plunger, through sprues or runners, into a mold. In the direct injection method, the heated mixture is forced directly into the mold, through runners and gates, by either a hydraulic plunger or by reciprocating screw equipment. Either method may be utilized. The compounded material is injection molded into turbine rotor sized shapes having cross sections up to 1.5 inch utilizing a 200 ton injection molding machine. Granulated material is loaded into the injection chamber and heated to the molding temperature. Optimum molding temperature is usually just above the melting point of the binder composition. Where paraffin wax is the major binder component the chamber temperature is 70°–72° C. The die is maintained at or slightly above room temperature (24°–40° C). Molding pressure must be sufficient to force the preheated mixture into all areas of the die. A pressure of 3,000 to 10,000 psi is adequate for these materials, die and molding conditions. The shot is injected into the die cavity and the pressure held for approximately one minute. The pressure is released, the die opened, and the part removed from the die.

The injection molded green turbocharger sized parts are embedded in a setter powder of calcined ceramic powder to support the component during the binder removal thermal cycle.

The binder is removed from the molded parts by heating the embedded parts in a non-oxidizing environment such as nitrogen up to a temperature of 450° C. to completely remove the binder. During initial heating at 10° C./hr or greater in which 15 w/o to 20 w/o of the binder is removed the setter powder forms a thick cake around the part. The cake prevents further binder loss until the temperature is sufficiently high, approximately 400° C. up to 450° C., to break down the barrier by thermal decomposition and vaporization of the binder. Thus, the majority of the binder loss occurs after a temperature of 400° C. is obtained and continues up to 450° C. The temperature of 450° C. is then raised to 600° C. and the heating is continued at 600° C. for up to 20 hours in an oxidizing environment such as air to remove the residual binder from the part. For turbine rotor sized test parts about 3 days of thermal treatment is sufficient to completely removed the binder. For larger than turbine rotor sized cross section parts a substantially lower heating rate, as low as 1° C./hr may be required or a total thermal treatment of approximately 17 days.

At this stage the glass fibers are still intact.

Densification techniques such as isopressing followed by sintering and HIPing can be used to form a pure monolithic ceramic body. The key to the process is to heat the component initially to a temperature above the softening point of the glass, then increase the temperature to the densification temperature. At this higher temperature the softened fibers offer no resistance to the particle motion and shrinkage associated with sintering. Therefore no observable densification distortion occurs as would be seen if using ceramic fiber or whisker reinforcement.

Similar improvements in processing are expected for slip cast components, allowing faster drying cycles with fewer flaws generated for an equivalent drying cycle when using fiber additions. In the case of slip cast components, the fibers would again be heated above their softening point prior to densification, and be incorporated into the intergranular phase.

EXAMPLE

A formulation of 6 w/o $Y_2O_3$ and the remainder $Si_3N_4$ powder is milled for about 6 to about 72 hours to obtain a ceramic feedstock powder.

The milled ceramic powder is compounded with about 34 v/o to about 42 v/o, preferably from about 37 v/o to about 40 v/o of a wax based binder such as 90 w/o paraffin wax, 5 w/o of surfactant, and 5 w/o of plasticizer and 1 v/o of silica fiber. The silica fibers have a nominal diameter of 10 microns and a chopped length of ¼ inch. The compounding is done in a twin bladed dispersion mixer. The mixing chamber is heated to 70° C. Mixing is continued until the material has a creamy, homogenous appearance.

The resulting mixture has rheological properties comparable to a thermoplastic material with a softening range of 40° to 75° C. It is pelletized or granulated according to well known techniques to a uniform granule size suitable as a feed material for injection molding apparatus.

A turbocharger sized test sample is injection molded using the mixture containing the 1 v/o silica fibers. The molded component is imbedded in a supporting setter powder and the binder is removed in a thermal cycle up to 450° C. in a nitrogen atmosphere and then from 450° to 600° C. in an air atmosphere. The rotor made using the 1 v/o silica fibers shows no externally detectable cracks. A companion sample made without the use of silica fibers shows several external cracks.

The rotor made using the silica fibers is encased in a glass encapsulating agent and densified by hot isostatic pressing at 1825° C. and 30,000 psi pressure for a period of 90 minutes. The densified ceramic rotor is removed for the glass encapsulating agent.

The completed rotor has an immersion density of 99% of the theoretical value and shows no indication of densification distortion.

This new and improved method of obtaining essentially crack free large cross section ceramic parts, especially turbine engine parts, enhances the reliability of ceramic applications in the automotive industry which can decrease emission pollution by increased operating temperatures and increase fuel economy by the decreased weight associated with the ceramic parts compared to conventional metal components.

While there has been shown and described what is at present considered the preferred embodiment of the invention, it will be obvious to those skilled in the art that various changes and modifications may be made therein without departing from the scope of the invention.

What is claimed is:

1. A method for making an essentially crack free large cross section ceramic article comprising the following steps:

Step 1—blending a ceramic article injection molding formulation containing a ceramic powder and a binder with from about 0.25 v/o to about 5.0 v/o short glass whiskers or fibers to form a mixture, said whiskers or fibers being selected from the group consisting of silica glass, high silica content glass, silicon oxynitride based glasses, and combinations thereof;

Step 2—injection molding said mixture from step 1 to form a molded article;

Step 3—heating said molded article from step 2 at a sufficient temperature and for a sufficient time to remove the binder to form a green body;

Step 4—heating the green body from step 3 to a temperature above the softening point of the glass fibers or whiskers and pressurizing the green body to a density greater than 98% of theoretical.

2. The method according to claim 1 wherein said ceramic powder comprises a silicon nitride based ceramic.

3. The method according to claim 2 wherein the silicon nitride based ceramic consists essentially of 94% silicon nitride and approximately 6% yttria.

4. The method according to claim 1 wherein said fibers or whiskers have a diameter of approximately 10 microns and a length of approximately ¼ of an inch.

5. The method according to claim 1 wherein step 4 comprises encasing the green body from step 3 in a glass encapsulating agent and hot isostatic pressing the encased green body at approximately 1825° C. and approximately 30,000 psi for a period of 90 minutes.

6. A method for making an essentially crack free large cross section ceramic article comprising the following steps:

Step 1—blending a ceramic article slip casting formulation containing ceramic powder, liquid vehicle dispersants and binder with from about 0.25 v/o to about 5.0 v/o short glass fibers or whiskers to form a mixture, said fibers or whiskers being selected from the group consisting of silica glass, high silica content glass, silicon oxynitride based glasses, and combinations thereof;

Step 2—slip casting said mixture from step 1 to form a cast article;

Step 3—removing residual of said liquid vehicle in a drying step to form a dried cast article;

Step 4—heating the dried cast article from step 3 at a sufficient temperature and for a sufficient period of time to remove the binder to form a green body;

Step 5—heating the green body from step 4 to a temperature above the softening point of the glass fibers or whiskers and pressurizing the green body to a density greater than 98% of theoretical.

7. The method according to claim 6 wherein said ceramic comprises a silicon nitride based ceramic.

8. The method according to claim 7 wherein the silicon nitride based ceramic consists essentially of 94% silicon nitride and 6% yttria.

9. The method according to claim 6 wherein said glass whiskers or fibers have a diameter of approximately 10 microns and a length of approximately ¼ of an inch.

10. The method according to claim 6 wherein step 5 comprises the green body from step 4 in a glass encapsulating agent and hot isostatic pressing the encased green body at approximately 1825° C. and approximately 30,000 psi for a period of 90 minutes.

11. A method for making an essentially crack free large cross section ceramic article comprising:

Step 1—blending a ceramic article injection molding formulation containing a ceramic powder and a binder with from about 0.5 v/o to about 5.0 v/o short glass fibers or whiskers to form a mixture, said fibers or whiskers being selected from the group consisting of silica glass, higher silica content glass, silicon oxynitride based glass and combinations thereof;

Step 2—injection molding said mixture from step 1 to form a molded article;

Step 3—embedding the molded article from step 2 in a setter powder and heating the embedded article to approximately 450° C. in a nitrogen atmosphere to partially remove the binder;

Step 4—heating the embedded article from step 3 in a oxygen containing atmosphere to approximately 600° C. to completely remove the binder to form a green body;

Step 5—encapsulating the green body from step 4 in glass and pressurizing the body at approximately 30,000 psi and at a temperature of approximately 1825° C. to soften the glass fibers or whiskers and densify the article to greater than 98% of theoretical.

12. The method according to claim 11 wherein the ceramic powder comprises a silicon nitride based ceramic.

13. The method according to claim 12 wherein the silicon nitride based ceramic consists essentially of 94% silicon nitride and 6% yttria.

14. The method according to claim 11 wherein said glass fibers have a diameter of approximately 10 microns and a length of approximately ¼ of an inch.

15. The method according to claim 11 wherein said ceramic article injection molding formulation comprises approximately 34 v/o to about 42 v/o of a wax based binder, approximated 1 v/o of glass fibers and approximately 57-65% v/o ceramic powder.

16. The method according to claim 15 wherein said wax based binder comprises 90 w/o paraffin wax, 5 w/o surfactant and 5 w/o plasticizer.

17. A method for making an essentially crack free large cross section ceramic article comprising:

Step 1—blending a ceramic article slip casting formulation containing ceramic powder, liquid vehicle dispersants and binder with about 0.5 v/o to about 5.0 v/o of glass fibers or whiskers to form a mixture, said glass fibers or whiskers being selected from the group consisting of silica glass, high silica content glass, silicon oxynitride based glass and combinations thereof;

Step 2—slip casting the mixture from step 1 to form a cast article;

Step 3—removing the residual of said slip casting formulation to form a dried cast article;

Step 4—embedding the dried cast article from step 3 in a setter powder and heating the embedded ceramic article to approximately 450° C. in anitrogen atmosphere to partially remove the binder;

Step 5—heating the embedded cast article from step 4 to 600° C. in an oxygen containing atmosphere to completely remove the binder to form a green body;

Step 6—encapsulating the green body from step 5 in glass and pressurizing the body at approximately 30,000 psi and at a temperature of approximately 1825° C. to soften the glass fibers or whiskers and densify the article to greater than 98% of theoretical.

18. The method according to claim 17 wherein said glass fibers have a diameter of approximately 10 microns and a length of approximately ¼ of an inch.

* * * * *